United States Patent [19]

Leondaridis et al.

[11] Patent Number: 5,182,088
[45] Date of Patent: Jan. 26, 1993

[54] REMOVAL OF GASEOUS HYDRIDES

[75] Inventors: Paul Leondaridis, Paris, France; Albert S. Vendel, Chicago, Ill.; Tarranum Akthar, Chicago, Ill.

[73] Assignee: L'Air Liquide, Societe Anonyme pour l'Etude et l'Exploitation des Procedes Georges Claude, Paris, France

[21] Appl. No.: 579,316

[22] Filed: Sep. 7, 1990

[51] Int. Cl.$^5$ .............................................. C01B 3/50
[52] U.S. Cl. .................................... 423/210; 423/220; 423/248; 423/659
[58] Field of Search ............... 423/210, 220, 248, 659; 502/343, 345, 347; 427/343; 156/606

[56] References Cited

U.S. PATENT DOCUMENTS

| | | | |
|---|---|---|---|
| 2,786,867 | 3/1957 | Hagemeyer et al. | 502/343 |
| 3,857,921 | 12/1974 | Tamura et al. | 423/213.5 |
| 3,864,399 | 2/1975 | McDowell et al. | 260/566 A |
| 4,442,077 | 4/1984 | Foster | 423/210 |
| 4,532,115 | 7/1985 | Nishino et al. | 423/210 |
| 4,593,148 | 6/1986 | Johnson | 585/823 |
| 4,743,435 | 5/1988 | Kitahara | 423/210 |
| 4,784,837 | 11/1988 | Kitayama | 423/210 |
| 4,910,001 | 3/1990 | Kitahara | 423/210 |
| 4,996,030 | 2/1991 | Kitahara et al. | 423/210 |
| 5,085,844 | 2/1992 | Nowack et al. | 423/245.1 |

FOREIGN PATENT DOCUMENTS

| | | | |
|---|---|---|---|
| 0121339 | 10/1984 | European Pat. Off. | 423/210 |
| 62-152515 | 7/1987 | Japan | 423/210 |

Primary Examiner—Gary P. Straub
Assistant Examiner—Timothy C. Vanoy
Attorney, Agent, or Firm—Oblon, Spivak, McClelland, Maier & Neustadt

[57] ABSTRACT

A metallic oxide catalyst, containing cupric oxide and an amount of one or more of AgO, HgO or CdO effective for enhancing the ability of the catalyst for removing gaseous hydrides from a gas stream.

14 Claims, 1 Drawing Sheet

REMOVAL OF GASEOUS HYDRIDES

BACKGROUND OF THE INVENTION

1. Field of the Invention

The present invention relates to a catalyst and a process of using the same for removing toxic gaseous hydrides from a gas stream.

2. Description of the Background

Various methods are known for the removal of gaseous hydrides from gas mixtures. Such gaseous hydrides are silane, disilane, trisilane, germane, arsine, phosphine, hydrogen sulfide, hydrogen selenide and diborane. For example, methods involving combustion or incineration, absorption by gas-liquid reaction or dry-type chemisorption are known.

Activated carbons have been used for toxic gas removal in several instances. However, plain-activated carbons have only adsorptive capabilities against hydrides, which may be released by desorption. For example, the use of impregnated carbons for arsine removal has been reported in U.S. Pat. No. 2,511,289. This technique has been specifically used in semiconductor applications. More recently, other studies have been reported for arsine and phosphine removal.

Certain metal oxide catalysts are known to react irreversibly with hydrides and their use for removing arsine and hydrogen sulfide has been noted in U.S. Pat. No. 4,593,148. In this patent, the use of CuO and ZnO is described. Unfortunately, cupric oxide, in conjunction with other oxides like zinc oxide, only absorbs a finite amount of hydride.

Thus, a need continues to exist for metal oxide catalysts, particularly cupric oxide catalysts, having an improved ability to absorb gaseous hydrides, for example, based upon the absorbed amount per volume of bed. With such an improvement, it would also be possible to extend the lifetime of catalysts made from such materials. Improved safety and a reduced cost of production would also thereby be attained.

SUMMARY OF THE INVENTION

Accordingly, it is an object of the present invention to provide a metal oxide catalyst having an increased ability to absorb gaseous hydrides.

It is further an object of the present invention to provide a method for removing gaseous hydrides from a gas stream.

Accordingly, the above objects and others which will be become more apparent, are provided by a metal oxide catalyst containing cupric oxide and an amount of one or more of AgO, HgO or CdO effective for enhancing the absorption of gaseous hydrides by the metal oxide catalyst.

DETAILED DESCRIPTION OF THE PREFERRED EMBODIMENTS

Figure 1:
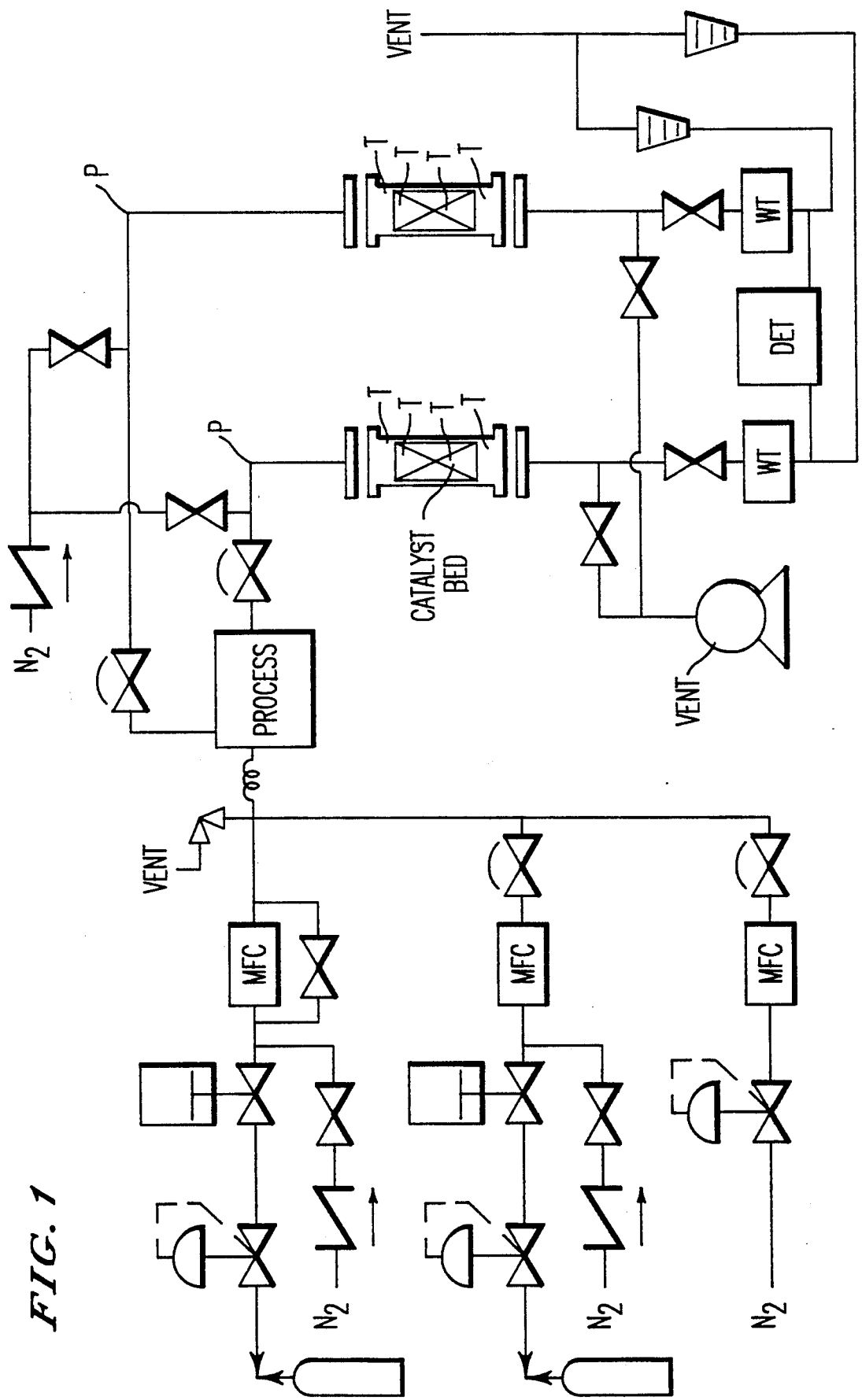
FIG. 1 illustrates a schematic perspective of an apparatus used in conjunction with the present invention.

In accordance with the present invention, it has been discovered that oxides of silver, mercury or cadmium surprisingly improve the efficiency of cupric oxide-zinc oxide catalysts for the removal of gaseous hydrides from a gas stream. Due to the improved efficiency of absorption of gaseous hydrides from gas streams, it is now possible to remove greater amounts of gaseous hydrides per volume of catalyst bed. It is also now possible to extend the lifetime of catalytic devices using the present metal oxide catalyst.

In particular, the metal oxide catalyst of the present invention is a cupric oxide based catalyst which may contain one or more other metal oxides such as ZnO, $Al_2O_3$, $SiO_2$, $MnO_2$, $Cr_2O_2$, NiO and $ZrO_2$. The present invention contemplates the addition of one or more of AgO, HgO or CdO to the metal oxide catalyst in an amount effective to enhance the ability of the metal oxide catalyst to remove gaseous hydrides from a gas stream.

Typically, one or more of AgO, HgO or CdO is added to the metal oxide catalyst in an amount of at least about 0.01 wt. %. However, it is preferred that the metal oxide catalyst contain at least about 0.1% by weight of AgO, HgO or CdO. Generally, it is unnecessary to use more than about 10% by weight of AgO, HgO or CdO in the metal catalyst. However, if desired, greater amounts of AgO, HgO or CdO may be used. In accordance with the present invention, however, it is more preferred to use about 0.1 to 10% by weight of AgO, HgO or CdO. It is most preferred to use about 0.2 to 5% by weight of these metal oxides. However, it is most preferred if AgO is used in the amount of about 0.2 to 5% by weight.

Generally, the metal oxide catalyst of the present invention may be used to remove any gaseous hydride from a gas stream. Typically, however, the gaseous hydrides which may be removed by the present catalyst are silane, disilane, trisilane, germane, arsine, phosphine, hydrogen sulfide, hydrogen selenide and diborane. These gaseous hydrides may be removed from gaseous mixtures also containing hydrogen, nitrogen, argon, helium and oxygen as other major constituents.

In removing the gaseous hydrides from the gas stream, any space velocity may be used which provides for an efficient removal of the gaseous hydrides. Generally, a space velocity in the range of about 2 to 20,000 $hr^{-1}$ is used. However, it is preferred to utilize a space velocity in the range of about 5 to 500 $hr^{-1}$.

In the present method of removing gaseous hydrides, the metal oxide catalyst of the present invention is typically placed in a vessel of any shape, preferably of a tubular shape, however, and a gas stream is passed thereover. In accordance with the present invention, the catalyst size is generally no more than about 1/5 of the effective diameter of the vessel. However, it is more preferred that the catalyst size be no more than about 1/10 of the effective diameter of the vessel.

The catalyst of the present invention may be prepared from a commercially available catalyst manufactured, for example, by United Catalyst of Louisville, Ky., which contains for example 60% CuO, 30% ZnO and 10% $Al_2O_3$. This commercially available copper oxide-based catalyst may be described as an "unpromoted" catalyst.

The present catalysts, containing one or more of AgO, CdO or HgO may be described as the "promoted" catalyst.

Generally, the present catalysts are prepared by co-precipitating the desired metal oxide amounts, drying the material to a powdered form and then pressing the composition into tablets. A binder may be used for the pressing step, if necessary. Each of these steps are, individually, known to those skilled in the art and pose no unusual manufacturing problems.

When the metal oxide catalyst of the present invention is contacted with a gaseous hydride or hydrides, it appears that chemisoption or absorption of the gaseous hydride or hydrides into the catalyst matrix occurs.

The present catalysts are advantageously used for the removal of a gaseous hydride or hydrides from gas streams, such as gas streams used in the semiconductor, solar cell or ceramic industries. The removal or dilution of residual hydrides is now necessary to prevent harmful concentrations of the same from being released into the environment.

The present invention will now be described by reference to certain examples which are provided solely for the purpose of illustration and are not intended to be limitative.

EXAMPLES

Two batches of catalysts were manufactured by the same manufacturer (United Catalyst, Louisville, Ky.) using the process as described above for each batch and differing only by 1% of silver oxide being present in the present or promoted catalyst.

The composition of the unpromoted catalyst (not containing silver oxide) was as follows in % by wt:

| | |
|---|---|
| CuO | 60% |
| ZnO | 30% |
| $Al_2O_3$ | 10% |

The composition of the promoted composition (containing silver oxide) was as follows in % by wt.:

| | |
|---|---|
| CuO | 60% |
| ZnO | 30% |
| $Al_2O_3$ | 9% |
| AgO | 1% |

Both catalysts were molded into $\frac{1}{4}'' \times \frac{1}{8}''$ pellets. Prior to each test, both catalysts were dried at about 150° C. under dry air flow for about 24 hrs.

Tests of catalyst hydride destruction capacity were carried out by loading one liter amounts of dried catalyst into a stainless steel vessel with an inside diameter of 7.0 cm and a length of 61 cm. The vessel and system tubing were evacuated and thermally purged of air. Then, the flow of the hydride of interest diluted in nitrogen was passed through the bed until a breakthrough occurred. Total breakthrough was established as the time when the outlet gas hydride concentration equalled the TLV for that compound. Gas flows were measured and maintained by mass flow controllers. Analysis of the effluent was accomplished by gas chromatography (TCD and FID) and an on-line MDA 7100 hydrides monitor. Flow rates, pressure and temperatures throughout the bed were monitored. FIG. 1 shows a schematic layout of the apparatus used.

EXAMPLE 1

Hydride concentration: 6% (v/v $SiH_4$
Flow rate : 2 slm
Destruction capacity (N 1/1 of catalyst)
Standard catalyst : 11.2
Promoted catalyst : 13.8

EXAMPLE 2

Hydride concentration : 6% (v/v) $SiH_4$
Flow rate : 1 slm
Destruction capacity (N 1/1 of catalyst)
Standard catalyst : 15.1
Promoted catalyst : 24.7

EXAMPLE 3

Hydride concentration : 5% (v/v) $PH_3$
Flow rate : 2 slm
Destruction capacity (N 1/1 of catalyst)
Standard catalyst : 34.1
Promoted catalyst : 51.7

Thus, the above results clearly illustrate the surprising improvement in hydride removal capacity for the promoted catalyst of the present invention. Having described the present invention, it will now be apparent to one of ordinary skill in the art that many modifications and changes can be made to the above embodiments while remaining within the spirit and scope of the present invention.

What is claimed as new and desired to be secured by Letters Patent of the United States is:

1. A method for removing gaseous hydrides from a carrier gas stream, which comprises contacting said gas stream with a metallic oxide composition consisting essentially of cupric oxide and from 0.1 to 10% by weight, based on the total weight of the composition, of one or more compounds selected from the group consisting of AgO, HgO and CdO; and wherein said gaseous hydride is selected form the group consisting of silane, disilane, trisilane, germane, arsine, phosphine and diborane.

2. The method of claim 1, wherein said metallic oxide composition further contains one or more of ZnO, $Al_2O_3$, $SiO_2$, NiO and $ZrO_2$.

3. The method of claim 1, wherein the metallic oxide composition contains about 0.2 to 5% by weight of one or more of AgO, HgO or CdO.

4. The method of claim 3, wherein the metallic oxide composition contains about 0.2 to 5% by weight of AgO.

5. The method of claim 1, wherein gaseous hydrides are removed from said gas stream at a space velocity of 2 to 20,000 $hr^{-1}$.

6. The method of claim 5, wherein said gaseous hydrides are removed from said gas stream at a space velocity of about 5 to 500 $hr^{-1}$.

7. The method of claim 1, wherein said gas stream further contains hydrogen, nitrogen, argon, helium or oxygen.

8. A method for removing gaseous hydrides from a carrier gas stream, which comprises contacting said gas stream with a metallic oxide composition consisting essentially of cupric oxide and zinc oxide and from 0.1 to 10% by weight, based on the total weight of the composition, of one or more compounds selected from the group consisting of AgO, HgO and CdO; and wherein said gaseous hydride is selected from the group consisting of silane, disilane, trisilane, germane, arsine, phosphine and diborane.

9. The method of claim 8, wherein said metallic oxide composition further contains one or more of $Al_2O_3$, $SiO_2$, NiO and $ZrO_2$.

10. The method of claim 8, wherein said metallic oxide composition contains about 0.2 to 5% by weight of one or more of AgO, HgO or CdO.

11. The method of claim 10, wherein said metallic oxide composition contains about 0.2 to 5% by weight of one or more of AgO.

12. The method of claim 8, wherein said gaseous hydrides are removed from said gas stream at a space velocity of 2 to 20,000 hr$^{-1}$.

13. The method of claim 12, wherein said gaseous hydrides are removed from said gas stream at a space velocity of 5 to 500 hr$^{-1}$.

14. The method of claim 8, wherein said gas stream further comprises hydrogen, nitrogen, argon, helium or oxygen.

* * * * *